2,963,448
TABLETING PROCESS FOR GRANULAR POROUS SOLID PARTICLES

Watson A. Ray, Rock Tavern, N.Y., assignor to Texaco Inc., a corporation of Delaware
No Drawing. Filed May 6, 1957, Ser. No. 657,067
12 Claims. (Cl. 252—455)

This invention relates to a process for tableting granular porous solid particles such as solid catalysts and catalyst supports for hydrocarbon treating operations. The solid particles concerned herein generally have the ability to adsorb, absorb or otherwise soak up water to the extent of at least about 5% of their weight without losing their discrete granular appearance.

Many solid catalysts, reactor packing materials, and catalyst supports are desired in tablet, pellet, or pill form because of the improved strength of, the greater uniformity of, or the desirable flow characteristics between the interstices of tablets, pellets, or pills. In a tableting operation a regulated amount of granular feed is put into a die cavity, and pressure is applied to form a tablet, pellet, or pill of desired shape and density.

Techniques for tableting absorbent solids which are abrasive, e.g., fluid cracking catalysts, chromia-containing catalysts and the like, or fluffy, e.g., zinc oxide-zinc chromite mixtures or carbon-supported catalysts, heretofore have been highly empirical. Thus $Cr_2O_3$—$Al_2O_3$ is most easily pelleted in an absolutely dry state whereas $Al_2O_3$—$SiO_2$ heretofore has been pelleted most successfully with 25–30% water by weight. Almost all types, after mixing with water (and apparently depending on rate of adsorption of the water), appear to need an ageing or "curing" period of hours or even days. Control of particular particle size or particle size distribution within narrow ranges also can be an important factor in some conventional tableting operations.

Certain fluffy materials, e.g., zinc oxide-zinc chromite catalysts or catalysts on carbon support, are difficult to tablet satisfactorily because they do not flow easily into the die, and the desirable kind of pellets or tablets can only be made by a "slugging operation" wherein preliminary pills, pellets, or tablets are knocked out in a rough way, regranulated, then the granulated product retableted. Frequently in a slugging operation the preliminary pills, pellets, or tablets more nearly resemble wafers than pills, pellets, or tablets. Other materials are best densified as a preliminary operation which comprises mixing with water and an adhesive agent such as sugar solution, molasses, or the like, drying, and repowdering.

My process takes the guesswork out of tableting, e.g., careful selection of specific narrow ranges of particle size or careful selection of special particle size distribution (depending on the material being tableted and varying from one kind of material to another) is of no concern; ageing need not be practiced; moisture content can be maintained low but without the necessity of going to bone dryness or to very high water contents; "capping" or lamination (disintegration during pelleting or upon ejection from the die) of the pellets or tablets is eliminated or at least markedly reduced; and the tableting can be accomplished in a single compression operation with complete elimination of slugging practice even when the particles being compressed are fluffy, abrasive, or have otherwise been considered to be refractory towards tableting.

My process comprises a conditioning step wherein a mass of the finely-divided particles is mixed with 1 to 10% of an ashless surface active agent, 0.5 to 10% of a fatty pelleting lubricant, and sufficient water to establish water content of the mass between about 5 and about 40%, these percentages being based upon the dry weight of the solid particles present in the mass. The proportion of water in the resulting mixture is regulated within the above limits for maintaining the particulate character of the solids constituting said mass. In other words, the solids are dampened without formation of a paste, a plastic or doughy mass, or a slurry (which is to be avoided in my process); there results no supporting liquid phase or even any apparent bodies of free liquid in the dampened mass. In essence, the loose granular character of the mass of solids is maintained even though it has been moistened. Of course, it must be recognized that some solids, e.g., $Al_2O_3$—$SiO_2$, can tolerate more moisture within the prescribed range than others, e.g., ZnO—$Cr_2O_3$, before undesirable pastiness becomes manifest.

In this loose granular state a portion of the treated mass is discharged into a confining die of a tableting machine. It flows freely into the die, preferably by gravity. The portion in the die is compressed into desired pellet shape using pressure (e.g., on the order of 25 to 50 tons per square inch, for a $\frac{5}{32}$" diamter by $\frac{5}{32}$" high pellet, although higher and lower pressures can be used if desired). The pellet so formed is ejected from the die. It can be calcined to burn out or otherwise dry off combustible and volatile materials therein if calcining is necessary or desirable. In some cases, hydrogenation or simple drying can be used to make the finished pellet.

For simplicity and uniformity I prefer to use about 10–25% water in making up the humified or dampened mass of solids, basis dry weight of the solid particles present, because I have found that this water concentration is desirably low and is quite adequate for tableting an extremely wide variety of materials.

The proportion of the surface active agent to dry solid particles used to form the dampened mass appears to be quite critical. Thus, I have found that use of substantially below about 1% by weight of the surface active agent (said 1% being based on 100% of the agent containing no diluent, organic builder such as carboxymethyl cellulose, or the like) does not appear to be adequate in the tableting operation to obtain smooth working of the machine and strong, dense pellets, pills or tablets in a single compressing operation. Use of the surface active agent in 1% by weight concentration gives an excellent tableted product and smooth operation of the machine and so does as much as 10% when tableting even highly refractory solids such as alumina-silica cracking catalyst. Concentration of 1% of the surface active agent is preferred, however, for economy, efficiency and all-around usefulness in my process. The desirable wetted mass in my operation is not extrudable as a continuous body in conventional manner.

The useful ashless surface active agents I have found are synthetic, and they can be removed practically completely from the pellet product by calcination (providing the solid particles forming the pellet body will not be damaged under the calcining conditions). I have found that the surface active agents, to be effective, do not have to be of a single class, but rather they can be nonionic, cationic, anionic or amphoteric (also called "ampholytic"). Furthermore, they can be pronouncedly hydrophilic or lipophilic, and mixtures of various surface active agents, e.g., hydrophilic one with lipophilic one, can also be used. Ordinarily and preferably the surface active agent will be in liquid phase, but solid ones can be used as a powder or a dispersion or solution, in either the water or the fatty pelleting lubricant.

While not intending to be bound by any theory as to how the surface active agent operates in my process, it is my opinion that their effect is strictly physical, and they tend to promote rapid and efficient dispersion of the water over the porous surface of solid particles being conditioned. The useful surface active agents are all of fairly high molecular weight, e.g., above 100, and those sufficiently dispersible in water to permit measurement of surface tension appear to have more than incidental power to reduce surface tension of the water. Thus, when dispersed in distilled water in low concentration (1% by weight) at 25° C., such surface active agents will lower the surface tension of the water to a value below 50 dynes per centimeter.

Suitable nonionic surface active agents for use in my process include, for example: products obtained by condensation of fatty substances and their derivatives with ethylene oxide, e.g., the "Tween" series, "Tween 20," "Tween 85," etc., the trade names for polyoxyethylene sorbitan fatty acid compounds; products obtained by condensation with ethylene oxide with phenolic compounds having side chains, e.g., "Triton X-100," the trade name for an alkyl aryl polyether alcohol; polyoxyethylene glycols of average molecular weight between about 300 and 1000 such as "Polyethylene Glycol 600," the trade name for a specially suitable one; and higher fatty acid partial esters of hexitol anhydrides such as those of the "Span" trade name series, e.g., "Span 20," "Span 80," etc.

A variety of suitable cationic surface active agents are also available for use in my process. These include alkylated oxazolines such as 2,4,4 trimethyl, 2 oxazoline of the trade name "Alkaterge C" and substituted oxazolines in homologous series therewith, namely, "Alkaterges" "A," "O," and "E"; fatty amines such as that of the trade name "Napcogen 14L"; alkyl polyoxyamines such as that of the trade name Katapol PN-430; quaternary ammonium bases such as that of the trade name "Aerosol C-61," or "Triton X-400" (a stearyl dimethyl benzyl ammonium chloride); or alkylolamides such as that of the trade name "Lupomin." Amphoteric surface active agents such as cetyl betaine, e.g., that of the trade name "Product BCO," or complex fatty amido materials such as that of the trade name "Antaron FC-34" are also useful in my process.

Suitable anionic surface active agents for use in my process contain no metallic component and include, for example, fatty acid esters of polyhydroxy alcohols such as that of the trade name "Kessco X-10"; ethanolamine lauryl sulfates such as that of the trade name "Maprofix TLS-500"; certain ammonium compounds, e.g., the ammonium salt of a sulfate ester of an alkyl phenoxy polyoxyethylene ethanol having the trade name "Alipal CO-436," or the ammonium salt of monoethyl phenyl phenol monosulfonate having the trade name of "Beaconol S," or the like. Advantageously, however, one will avoid those surface active agents containing a material which will act as a catalyst poison if the pellets are to be used as catalysts or catalyst supports.

Preferably, for efficiency and economy in the practice of my process, I employ as the surface active agent at least one selected from the group consisting of an alkylated oxazoline such as "Alkaterge C," "A," or "E," a polyoxyethylene glycol having molecular weight between 300 and 1000, a fatty acid partial ester of hexitol anhydrides (the fatty acid having at least 6 carbon atoms) such as sorbitan monooleate (e.g., "Span 80") or sorbitan laurate (e.g., "Span 20"), a product of alkylene oxide condensation with said partial ester of hexitol anhydrides (e.g., "Tween 20" and "Tween 85"), and an alkylphenol-alkylene oxide condensation product such as "Hercules Adduct N-2," "N-4," "N-9.5," and "N-15."

A conventional fatty pelleting lubricant, 0.5-10% and preferably about 5% based on the dry weight of the solids, is incorporated into the mixture for the conditioning before tableting. Suitable fatty pelleting lubricants include vegetable and animal oils and fats and their hydrogenated counterparts, e.g., "Sterotex" (the trade name of a hydrogenated vegetable fat), tallow, and wool fat, glycerol oleates, glycerides of fatty acids such as glycerol monolaurate, glycerol monostearate, glycerol monopalmitate, glycerol dipalmitate, and glycerol tristearate, the fatty acid moity of the foregoing glyceryl ester generally having between about 10 and 18 carbon atoms. Such lubricant assists in permitting ejection of a pellet, pill, or tablet from the die, and it will burn out of the pellet, pill, or tablet upon calcination if calcination is practiced. The lubricant is not to be construed as a substitute for the surface active agent or any portion thereof even though the particular surface active agent used may have incidental lubricating qualities.

While the particles for tableting in my process need not be carefully maintained in a particular narrow size range or of special fineness (e.g., 100 mesh or finer or between 100 and 325 mesh or with other such hampering restriction) it is advantageous for pelleting that the particles used pass a 20 mesh screen. When conditioned in accordance with invention principles such particles flow very easily from a heap in a bin or a hopper into the pelleting die. Accordingly, the particle size finer than 20 mesh can be quite random for efficient practice of my process.

The following examples show ways in which my invention has been practiced, but should not be construed as limiting the invention. The weights of solids for tableting referred to herein are weights at bone dryness, i.e., the weights of solid dried at 220° F. to constant weight and therefore free of all extraneous water and including only water of hydration should that be present in the structure. The percentages recited are weight percentages based on the weight of the bone dry solids. All solids used could pass through a 20 mesh screen (U.S. Standard). The pellets made were right cylindrical pills having both diameter and height of about 5/32 inch. No ageing period was used before tableting. The tableting machine used was a model RB2 made by the F. J. Stokes Corporation, Philadelphia, Pa. The pressure exerted in the tableting process by the machine was estimated to be about 25-50 tons per square inch.

*Example 1.*—Two batches of alumina-silica cracking catalyst having the trade name "American Cyanamid Aerocat MSB," 70% of which passed a 325 mesh screen, were tableted. The first batch was made up by blending with 100 grams of the catalyst, 25 ml. water, 9.3 grams Alkaterge A, an alkylated oxazoline, and 5 grams glyceryl monostearate pelleting lubricant. The second batch was made up the same way except that 10 grams of the lubricant was used. Pellets were made from both batches and were calcined at 1000° F. for three hours. In each case the tableting machine operated smoothly, and the pellets were compact, dense, and substantially uniform with the single compression operation. No capping occurred. Average pellet crushing strength determined from a sample of the first batch was 12 pounds and, from a sample of the second batch, 5 pounds.

*Example 2.*—Four batches of the kind of catalyst described in Example 1 were tableted with Alkaterge C, an alkyl oxazoline, using various concentration of the surface active agent and 5% of "Sterotex" in each batch. A summary of these experiments is tabled below.

| Wetting Agent, Percent | Water Content, Percent | Average Pellet Crushing Strength, Pounds | Comments on Tableting Operation |
| --- | --- | --- | --- |
| 0.2 | 10 | 9 | Machine binds. Many tablets disintegrated on ejection. |
| 0.5 | 10 | 5 | Do. |
| 1.0 | 10 | 12 | Operation and product very good. No capping of the tablets occurred. |
| 10.0 | 25 | 12 | Do. |

*Example 3.*—A fluffy, comparatively abrasive zinc oxide-zinc chromite catalyst powder containing 52% zinc oxide was made up into five batches. For each batch 100 grams of the catalyst, 1 gram of Alkaterge C, 5 grams of lubricant, and 10 ml. of water were blended. The so-conditioned solids flowed easily by gravity into the dies. Pellets were formed, ejected, dried on a steam plate overnight, then calcined for three hours at 1,000° F. The product pellets were compact, dense, full size (5/32″ x 5/32″), and uniform. Slugging, customary for the satisfactory pilling of this catalyst, had been completely eliminated. No capping of the pellets occurred. Average pellet crushing strengths were as follows:

| Batch No. | Lubricant Used | Pellet Crushing Strength, Pounds |
|---|---|---|
| 1 | monostearin (a technical grade of glycerol monostearate). | 8 |
| 2 | tristearin (a technical grade of glycerol tristearate). | 12 |
| 3 | monopalmitin (a technical grade of glycerol monopalmitate). | 8 |
| 4 | glyceryl monolaurate | 15 |
| 5 | Sterotex (the trade name for a hydrogenated vegetable fat). | 14 |

*Example 4.*—A wide variety of porous solid catalysts were tableted by my procedure after conditioning with 10% water, 1% Alkaterge C, and 5% Sterotex. In each case the tableting machine operated smoothly, and compact, dense, substantially uniform pellets were produced in the single compression operation. The solids so pelleted are listed below:

$Pt$—$SnO_2$—$Al_2O_3$
$Cr_2O_3$—$SnO_2$—$Al_2O_3$
$NiO$—$SnO_2$—$Al_2O_3$
$NiO_2$—$Cr_2O_3$—$ZrO_2$
$BaO$—$Fe_2O_3$
$ZnO$—$Cr_2O_3$—$Al_2O_3$
$ZnO$—$Cr_2O_3$—$CrF_3$—$B_2O_3$
$WS_2$—$AlF_3$—½$H_2O$—$Al_2O_3$
$Pt$—$MgF_2$—$MgO$—$SiO_2$
$Pt$—$MgO$—$SiO_2$
$Pt$—$ZrO_2$—$Al_2O_3$
$NiO$—$Al_2O_3$—$SiO_2$
$ZnO$—$Cr_2O_3$—$Al_2O_3$—$SiO_2$
$ZnO$—$Cr_2O_3$—$BaO$ $ZnO$—$Cr_2O_3$
$Pt$—$MoO_3$—$Al_2O_3$
$Cr_2O_3$—$Al_2O_3$—$SiO_2$
$MoO_3$—$Al_2O_3$—$SiO_2$
$Co_3O_4$-diatomaceous silica
$ZnO$—$Cr_2O_3$—$CaO$
$ZnO$—$Cr_2O_3$—$V_2O_5$
$Fe$—$MoO_3$—$C$
$MgO$—$Cr_2O_3$
$NiO$—$Al_2O_3$
$Cr_2O_3$—$ZrO_2$—$Al_2O_3$
$NiO$—$ZrO_2$—$Al_2O_3$
$Cr_2O_3$—$Bi_2O_3$—$Al_2O_3$
$NiO$—$Bi_2O_3$—$Al_2O_3$ In a similar operation the pelleting of a $$ZnO—Cr_2O_3—Al_2O_3—AlF_3—½H_2O$$ 

catalyst powder was equally successful using 1% Alkaterge C, 5% Alkaterge O, 20% water, and 5% Sterotex.

*Example 5.*—The usefulness of pronouncedly lipophilic and pronouncedly hydrophilic surface active agents as well as those intermediate in this regard was demonstrated in the tableting of a number of batches of alumina-silica cracking catalyst powder conditioned in accordance with invention principles using 10% water, 1% surface active agent, and 5% Sterotex. The fresh pellets were finished by calcining at 1000° F. for six hours, thereby removing practically all of the lubricant and the surface active agent. The following table summarizes the results of the operation:

| Batch No. | Surface Active Agent Used | Solubility of the Surface Active Agent in Water | Remarks |
|---|---|---|---|
| 1 | "Hercules Adduct N-2". | Practically none | All batches pelleted easily to give uniform, very hard pills having no apparent differences. |
| 2 | "Hercules Adduct N-4". | Slight | |
| 3 | "Hercules Adduct N-9.5". | Slight after shaking. | |
| 4 | "Hercules Adduct N-15". | Slight after heating water. | |
| 5 | "Tween 20" | Very soluble | |

The above-described "Hercules Adducts" are alkyl-phenol ethylene oxide condensation products, and the "Tween 20" is a polyoxyethylene sorbitan monolaurate.

In each of the preparations described in Examples 1–5, above, a mixture of the water and the surface active agent was poured on to the solids to be tableted, then the fatty pelleting lubricant blended into the so-treated mass. Such sequence is preferred because it gives an apparently uniform dispersion of the treating agents in the mass very rapidly and with only a small amount of mixing. It will be understood, however, that the several treating agents can be mixed in other sequences or all together with the solids to be tableted without departing from the scope of this invention or losing the advantages thereof.

I claim:

1. A process for tableting granular porous solid particles which are capable of sorbing water to the extent of at least 5 percent without losing their discrete granular appearance selected from the group consisting of solid catalysts and catalyst supports for hydrocarbon treating operations which comprises: mixing a mass of said particles with about 1 to 10% of an ashless synthetic surface active agent, said surface active agent having a molecular weight above about 100, and a 1% by weight water solution thereof being capable of lowering the surface tension of water to a value below about 50 dynes per centimeter, 0.5 to 10% of a fatty pelleting lubricant selected from the group consisting of vegetable oils and fats, animal oils and fats, hydrogenated vegetable oils and fats, hydrogenated animal oils and fats, glycerol oleates and glycerides of long chain fatty acids, and sufficient water to establish water content of said mass between about 5% and about 40%, the foregoing percentages being based upon the dry weight of the solid particles present in said mass, the proportion of water in the resulting mixture being regulated within the above limits for maintaining the particulate loose character of the solids initially constituting said mass; discharging a portion of said resulting dampened mixture into a confining die; compressively shaping said portion in said die to form a tablet; and removing said tablet from said die.

2. The process of claim 1 wherein the resulting dampened mixture contains about 10–25% water and about 1% surface active agent.

3. The process of claim 1 wherein said surface active agent is at least one selected from the group consisting of an alkylated oxazoline, a high molecular weight polyoxyethylene glycol, a higher fatty acid partial ester of hexitol anhydrides, a product of alkylene oxide condensation with said partial ester of hexitol anhydrides, and an alkylphenol-alkylene oxide condensation product.

4. The process of claim 1 wherein the granular porous solid particles used are finer than 20 mesh size.

5. A tableting composition consisting essentially of from about 80 to about 94.5 percent of granular solid particles selected from the group consisting of solid catalysts and catalyst supports for hydrocarbon treating operations which are capable of sorbing water to the extent of at least about 5 percent of their dry weight without losing their discrete granular appearance, from about 1 to 10 percent of an ashless synthetic surface active agent, said surface active agent having a molecular weight above about 100, and a 1% by weight water solution thereof being capable of lowering the surface tension of water to a value below about 50 dynes per centimeter from 0.5 to 10 percent of a fatty pelleting lubricant selected from the group consisting of vegetable oils and fats, animal oils and fats, hydrogenated vegetable oils and fats, hydrogenated animal oils and fats, glycerol oleates and glycerides of long chain fatty acids, and sufficient water to establish a water content of the composition between about 5 to 40 percent, said percentages being based on the dry weight of the solid particles in the composition, the proportion of water in the resulting mixture being regulated within the above limits for maintaining the particulate loose character of the solids initially constituting said mixture.

6. The composition of claim 5 wherein the resulting dampened mixture contains about 10–25% water and about 1% surface active agent.

7. The composition of claim 5 wherein said surface active agent is at least one selected from the group consisting of an alkylated oxazoline, a high molecular weight polyoxyethylene glycol, a higher fatty acid partial ester of hexitol anhydrides, a product of alkylene oxide condensation with said partial ester of hexitol anhydrides, and an alkylphenolalkylene oxide condensation product.

8. The composition of claim 5 wherein the granular porous solid particles used are finer than 20 mesh size.

9. A tableting composition for preparing solid catalysts for hydrocarbon treating operations, consisting essentially of granular, porous solid catalyst particles for hydrocarbon treating operations which are capable of sorbing at least 5 percent by weight of water without losing their discrete granular appearance, from about 1 to 10 percent of an ashless synthetic surface active agent, said surface active agent having a molecular weight above about 100, and a 1% by weight water solution thereof being capable of lowering the surface tension of water to a value below about 50 dynes per centimeter from about 0.5 to 10 percent of a fatty pelleting lubricant selected from the group consisting of vegetable oils and fats, animal oils and fats, hydrogenated vegetable oils and fats, hydrogenated animal oils and fats, glycerol oleates and glycerides of long chain fatty acids and from about 5 to 40 percent of water, said water being present in an amount sufficient to maintain the loose particulate character of the solid particles initially constituting said composition.

10. The composition of claim 9 wherein said solid particles are an alumina-silica cracking catalyst, said surface active agent is 2,4,4 trimethyl 2-oxazoline, and said fatty pelleting lubricant is a hydrogenated vegetable fat.

11. The composition of claim 9 wherein said solid particles are a zinc oxide-zinc chromite catalyst containing about 52 percent zinc oxide, said surface active agent is 2,4,4 trimethyl 2-oxazoline, and said fatty pelleting lubricant is a glyceride of a fatty acid, the fatty acid moity having between about 10 and 18 carbon atoms.

12. A method of preparing a tableting mixture which comprises providing a mass of granular solid porous particles selected from the group consisting of solid catalysts and catalyst supports for hydrocarbon treating operations, said particles being capable of sorbing water to the extent of at least 5 percent of their dry weight without losing their discrete granular appearance, adding to said mass from 1 to 10 percent of an ashless synthetic surface active agent said surface active agent having a molecular weight above about 100, and a 1% by weight water solution thereof being capable of lowering the surface tension of water to a value below about 50 dynes per centimeter and sufficient water to provide to said mixture a water content of from about 5 to 40 percent, said water component being employed in an amount sufficient within said limits to maintain the particulate loose character of the solid particles initially constituting said mixture, and adding from 0.5 to 10 percent of a fatty pelleting lubricant selected from the group consisting of vegetable oils and fats, animal oils and fats, hydrogenated vegetable oils and fats, hydrogenated animal oils and fats, glycerol oleates and glycerides of long chain fatty acids to said dampened mass, said percentages being based on the dry weight of the solid particles in the mixture.

References Cited in the file of this patent

UNITED STATES PATENTS

| | | |
|---|---|---|
| 1,996,220 | Tigerschiold et al. | Apr. 2, 1935 |
| 2,001,134 | Hardy | May 14, 1935 |
| 2,027,532 | Hardy | Jan. 14, 1936 |
| 2,386,604 | Goetzel | Oct. 9, 1945 |
| 2,485,128 | Adams | Oct. 18, 1949 |
| 2,580,708 | Wallace | Jan. 1, 1952 |
| 2,614,050 | Rusoff | Oct. 14, 1952 |
| 2,694,245 | Rogers et al. | Nov. 16, 1954 |
| 2,829,427 | Tacvorian et al. | Apr. 8, 1958 |

FOREIGN PATENTS

| | | |
|---|---|---|
| 1,068,499 | France | Dec. 22, 1952 |

OTHER REFERENCES

Ser. No. 382,101, Passelecq et al. (A.P.C.), published May 11, 1943.

UNITED STATES PATENT OFFICE
CERTIFICATION OF CORRECTION

Patent No. 2,963,448  December 6, 1960

Watson A. Ray

It is hereby certified that error appears in the above numbered patent requiring correction and that the said Letters Patent should read as corrected below.

Column 1, line 17, after "their" insert -- dry --.

Signed and sealed this 9th day of May 1961.

(SEAL)
Attest:
ERNEST W. SWIDER
Attesting Officer

DAVID L. LADD
Commissioner of Patents